United States Patent [19]
Matsuo

[11] 3,837,604
[45] Sept. 24, 1974

[54] MEANS FOR CONTROLLING THE DEPLOYMENT AND THE DEVELOPMENT OF A PARACHUTE CANOPY

[75] Inventor: John T. Matsuo, El Centro, Calif.

[73] Assignee: The United States of America as represented by the Secretary of the Navy, Washington, D.C.

[22] Filed: Oct. 6, 1972

[21] Appl. No.: 295,769

[52] U.S. Cl. ................................................ 244/152
[51] Int. Cl. ........................................... B64d 17/22
[58] Field of Search ........... 244/152, 141, 142, 145, 244/147-150

[56] References Cited
UNITED STATES PATENTS

| | | | |
|---|---|---|---|
| 2,553,909 | 5/1951 | Frieder et al. | 244/148 |
| 2,981,505 | 4/1961 | Oakley | 244/149 |
| 3,047,261 | 7/1962 | Bockelmann | 244/150 |
| 3,104,855 | 9/1963 | Barish | 244/147 |
| 3,506,225 | 4/1970 | Snyder | 244/149 |
| 3,525,491 | 8/1970 | Barish | 244/142 |

FOREIGN PATENTS OR APPLICATIONS

| | | | |
|---|---|---|---|
| 184,153 | 7/1966 | U.S.S.R. | 244/147 |

Primary Examiner—Trygve M. Blix
Assistant Examiner—Sherman D. Basinger
Attorney, Agent, or Firm—R. S. Sciascia; G. J. Rubens

[57] ABSTRACT

A simple technique is proposed for achieving near-optimum parachute canopy deployment without the need for additional equipment by bundling together the suspension lines and forming therein a series of gradually releasable daisy-chain slip knots. The daisy-chained suspension lines are connected to the canopy skirt by means of a releasable locking device which enables the suspension lines gradually to unravel in a taut condition until the skirt is released by the locking device enabling the drag-producing surface fully to inflate.

6 Claims, 9 Drawing Figures

PATENTED SEP 24 1974　　　　　　　　3,837,604

MEANS FOR CONTROLLING THE DEPLOYMENT AND THE DEVELOPMENT OF A PARACHUTE CANOPY

BACKGROUND OF THE INVENTION

This invention relates to parachutes, and more particularly to means for controlling the operation of a parachute and the forces generated therein.

In the initial deployment of any parachute two principal forces are involved. Snatch forces are forces of short duration imposed on the suspension lines by the sudden acceleration of the canopy mass at the instant of complete extension of the suspension lines prior to inflation of the drag-producing surface. Opening shock forces are forces applied to the drag-producing surface. These two forces on the canopy are not additive; rather the opening shock forces follow closely after the snatch forces.

With low-shock canopies now in use employing such techniques as special reefing, venting, collapsing or squidding canopy designs, it is believed by the industry that the limiting factor on future parachute operation will involve the snatch forces. Snatch forces, however, can be reduced only by controlled deployment, a very difficult process if the deployment system is to be usable over a large range of speed, and by reduction of parachute weight and canopy drag area.

SUMMARY OF THE INVENTION

The present invention provides a simple technique for packaging and connecting the suspension lines of a parachute canopy to provide for a more orderly and safe deployment, as well as reducing the snatch forces and opening shock forces that are generated during parachute operation. It is important to note initially that this inventive technique in one modification does not involve the use of any additional equipment to achieve these unique results, and in other modifications all that is involved is the mere addition of several fabric loops involving a minimal weight and cost.

One aspect of the invention involves the packaging or bundling of the suspension lines in a daisy-chain configuration, that is, the formation of a continuous series of releasable single slip knots. The formation of these slip knots is initially started at the canopy skirt and extend for a major portion, or the entire portion, of the length of the suspension lines to the load end. As the suspension lines are bundled in an orderly manner, the likelihood of a casualty by fouling of the lines is prevented. Upon initial deployment, the daisy-chained suspension lines commence to unravel starting from the load end and gradually unravelling upwardly to the canopy skirt end. This gradual unravelling maintains the suspension lines in a taut condition throughout the deployment phase which reduces the snatch force, and simultaneously minimizing the likelihood of canopy malfunction.

Another aspect of this invention resides in the use of a releasable restraining device connecting the upper end of the daisy-chained suspension lines to the canopy skirt. The restraining device can be in the form of a double-twist slip knot formed in the bundled suspension lines, or separate flexible loops attached to the canopy skirt and adapted releasably to engage the bundled suspension lines. Any one of these simple restraining means function to prevent premature inflation of the drag surface, and reduce the developed snatch forces.

STATEMENT OF THE OBJECTS OF THE INVENTION

A principal purpose of this invention is to provide a simple and effective apparatus for achieving a near-optimum parachute canopy deployment.

Another important purpose is to provide such apparatus which will reduce the magnitude of both the snatch forces and shock forces developed during both the deployment and development phases of the parachute operation.

Still other important objects are to device a parachute apparatus which will simplify and reduce the packing time; and which will permit the invention to be applied to existing parachutes in the inventory with a minimum of modification and little additional weight.

Other objects, advantages and novel features of the invention will become apparent from the following detailed description of the invention when considered in conjunction with the accompanying drawings.

DESCRIPTION OF THE PREFERRED EMBODIMENT

Figure 1:
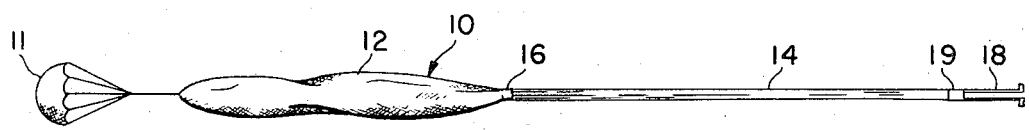
FIG. 1 illustrates a standard parachute canopy stretched out preparatory for packing.
Figure 9:
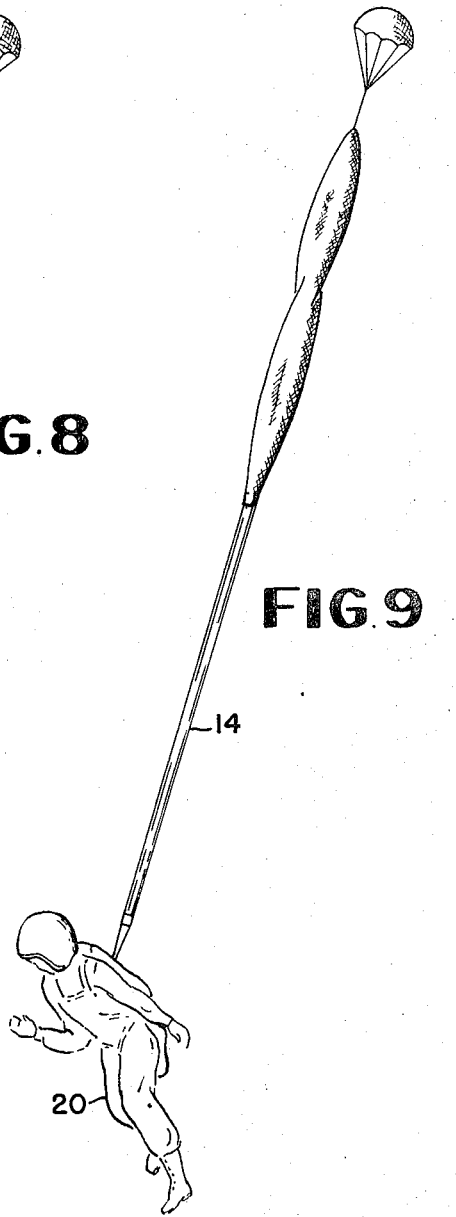
FIG. 9 is a similar view as FIG. 8 in which the restraining device has been released to permit subsequent inflation and development of the drag surface.

Referring to the drawings where like reference numerals refer to similar parts throughout the figures there is shown generally in FIG. 1, a standard parachute 10 horizontally stretched out on a packing table or the like in a relaxed condition. The parachute includes a pilot chute 11 connected to a main canopy which comprises a drag-producing surface 12, and a plurality of suspension lines 14 shown grouped in a bundle for connecting a peripheral skirt portion 16 of the drag surface to two pairs of riser straps 18 through connector links 19 for connection to a load, such as a parachutist 20 (FIGS. 9 to 11).

Figure 2:
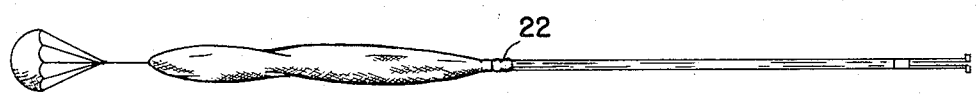
FIG. 2 is a similar view as FIG. 1 showing diagrammatically the formation of a releasable restraining device in the bundled suspension lines at the canopy skirt end.

As a first step in applying the teaching of the invention to the standard parachute, a restraining device generally indicated at 22 is formed in the bundled suspension lines 14 immediately adjacent canopy skirt 16 as shown in FIG. 2. Restraining device 22 may be any one of three modified forms shown and later described with reference to FIGS. 4, 5 and 6. As will be described later the purpose of restraining device 22 is to maintain the skirt or mouth of drag-producing surface 12 in a substantially closed condition by cinching the supension lines to prevent its premature inflation during initial descent and until the suspension lines are fully extended. Such an arrangement ensures a more orderly and safe parachute deployment.

Figure 3:
FIG. 3 is a similar view as FIG. 2 showing diagrammatically the remainder of the suspension lines having been daisy-chained from the restraining device to the load attaching device.

The second step in applying the teaching of the invention is to fabricate the remaining length, or a portion thereof, of the bundled suspension lines 14 in a daisy-chain configuration indicated at 23 in FIG. 3. A daisy-chain is a series of single, releasable slip knots formed in the bundled lines commencing from the restraining device 22 and preferably ending at connector links 19. A detailed showing of a daisy-chained knot can be seen in my pending patent application entitled "Parachute Decoupling Apparatus," Ser. No. 287,928 filed on 11 Sep 1972 now U.S. Pat. No. 3,776,493. The daisy-chained line 23 will begin to unravel during deployment starting from the load end and unravelling upwardly. This action reduces the snatch force by allowing the canopy mass to accelerate in small increments. As is apparent from a comparison of FIGS. 1 to 3, the daisy-chaining of the bundled suspension lines also provides a more compact, and orderly packaging of the suspension lines which prevents fouling of the lines during deployment and minimizes canopy malfunction. Tests have disclosed that no friction burns occur during unravelling of the daisy chain, since friction burns are the result of resistance and no measurable resistance has been found during unravelling of the daisy-chained suspension lines.

Figure 4:
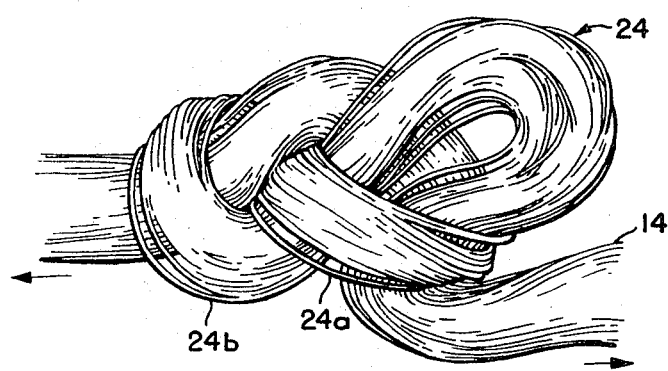
FIG. 4 shows an enlarged plan view of a first modification of a restraining device in the form of a double-twist releasable knot.

The first modification of the restraining device is shown in FIG. 4, and comprises in essence a double slip knot 24 formed in the end of the bundled suspension lines immediately adjacent canopy skirt 16. The manner of forming knot 24 is obvious from the drawing and comprising two loops 24a and 24b which provide a snubbing action. While no measurable resistance has been found during the unravelling of the daisy-chained line, a very small resistance has been measured in the unravelling of double-twist knot 24, however, no friction burns were evident when tested at 800 feet per second parachute deployment airspeed. In addition to minimizing friction burns, the double-twist knot also minimizes excessive tightening of the initial starting twists of the daisy-chain line 23.

Figure 5:
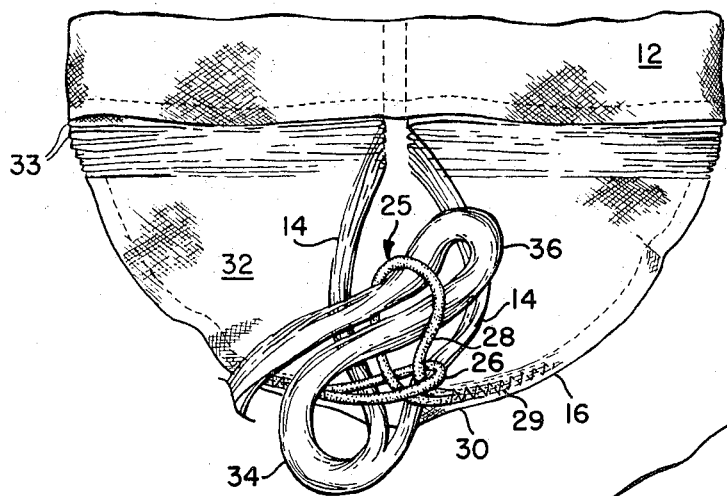
FIG. 5 shows a perspective view of a folded drag surface partially spread apart to show a second modification of a restraining device in the form of a pair of flexible loops.

A second modification of the restraining device is shown, in FIG. 5, the folded parachute being shown spread-apart to show the details. In this modification, the restraining device 25 comprises a single pair of loops 26 and 28, one of which may be referred to as a male loop and the other a female loop. The bitter ends of each loop are sewn or otherwise secured at 29 in adjacent positions on a band 30 of canopy skirt 16 to permit the loops to be mated. As shown in FIG. 5, restraining device 25 is attached to what is illustrated as a bottom side 32 of drag surface 12. In the packing procedure, the suspension lines 14 connected to the canopy gores 33 on the left and right hand are drawn downwardly in the space between the mated loops and bottom 32 and thence bundled together at 34. An intermediate fold 36 is then formed in suspension line bundle 34, and, thereafter, the fold 36 is projected through male loop 28. The suspension lines are now snubbed together between the loops and bottom 32, and also by the interlocked loops 26 and 28, to maintain the canopy skirt in a deflated condition. The remaining length of suspension line bundle 34 can be then daisy-chained as shown at 23 in FIG. 3.

Figure 6:
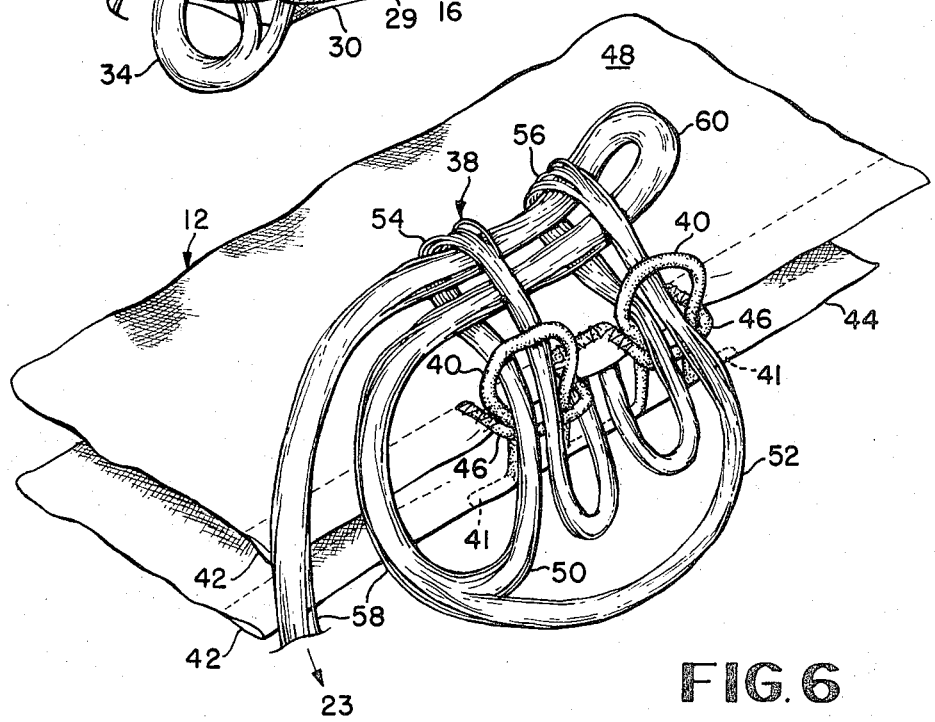
FIG. 6 shows an assembled perspective view of a third modification of a restraining device in the form of two pairs of flexible loops.

A third modification of the restraining device is shown in FIG. 6, wherein a restraining device 38 is provided with two pairs of loops, as distinguished from the single pair of loops in FIG. 5. In FIG. 6, a pair of male loops 40 are sewn or otherwise secured at 41 in adjacent positions on the inside surface of canopy skirt band 42 on a bottom side 44 of drag surface 12. A pair of corresponding female loops 46 are secured to skirt band 42 on a top side 48 of the drag surface. In other words, in a twenty-eight gore parachute, male loops 40 may be secured to gore No. 14 and female loops 46 secured to diametrically opposite gore No. 28, so that when the parachute is folded, as shown in FIG. 5, each male loop 40 will mate with a corresponding female loop 46 to form a snubbing eye portion therebetween, as shown. In FIG. 6, one-half of the total number of suspension lines 14 extending from the gores (see FIG. 5) are grouped together forming left and right-hand bundles 50 and 52, respectively. Intermediate folds 54 and 56 are formed in bundles 50 and 52, respectively, and each fold inserted through the eye portion formed in the corresponding pairs of mated loops. The remaining ends of both bundles are combined as a single bundle 58, and an intermediate fold 60 is formed which is then inserted through the folds 54 and 56. In this manner a multiple snubbing action is provided at spaced points in the suspension lines. The remaining length of bundle 58 can then be daisy-chained as shown at 23 in FIG. 3.

Although tests have indicated that no friction burns will occur in the unravelling of restraining device 24 of FIG. 4, the restraining devices 25 of FIG. 5, and 38 of FIG. 6 are susceptible to some friction burns, as are existing prior art devices using deployment bag containers, reefing lines, etc.

Figure 7:
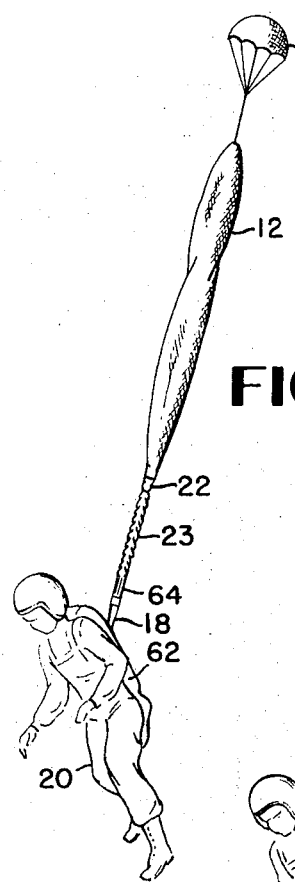
FIG. 7 illustrates a free falling parachutist under a controlled canopy deployment with the skirt of the canopy drag surface being held closed by one of the three illustrated restraining devices of FIGS. 4, 5 or 6, and showing the daisy-chained suspension lines starting to unravel upwardly from the point of connection with the parachutist.
Figure 8:
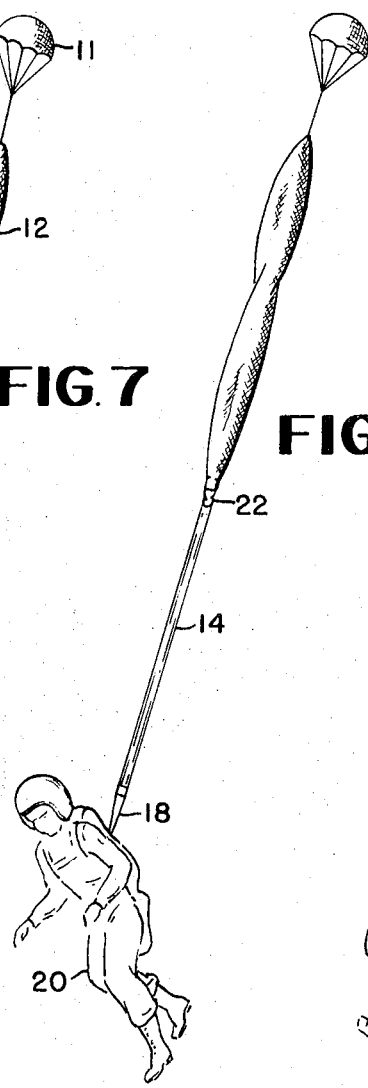
FIG. 8 is a similar view as FIG. 7 showing the daisy-chained suspension lines completely unravelled up to the restraining device which is maintaining the drag surface in a closed condition.

FIGS. 7, 8 and 9 show selected sequences in the operation of the novel parachute canopy employing the invention concepts. FIG. 7 shows a free-falling parachutist 20 having descended to where the pilot chute 11 has extracted drag-producing surface 12 from a parachute harness container 62. One of the representative restraining devices 22 is restricting the inflation of the drag-producing surface 12. The bundled daisy-chained suspension lines 23 have commenced unravelling upwardly gradually at the load end for a length indicated at 64. This action gradually reduces the snatch forces exerted on the canopy and prevents premature canopy inflation. In FIG. 8 the daisy-chained bundle 23 of suspension lines has completely unravelled reaching restraining device 22, which is then released as shown in FIG. 9. The deployment phase of canopy operation has been completed, and the canopy enters into the development phase in which the drag-producing surface is allowed to inflate.

The invention concept greatly improves the deployment characteristics of any standard parachute canopy in the modification of FIG. 4 without the use of any ancillary equipment, and in the modifications of FIGS. 4 and 5 by the addition of simple, lightweight fabric looping devices.

Obviously many modifications and variations of the present invention are possible in the light of the above teachings. It is therefore to be understood that within the scope of the appended claims the invention may be practiced otherwise than as specifically described.

What is claimed is:

1. A parachute canopy comprising:
a drag-producing surface having a skirt portion;
a load attaching device;
a plurality of suspension lines connecting the skirt to the load attaching device;
said suspension lines being bundled together and daisy-chained in a series of releasable slip knots extending for a major portion of their length from the skirt end to the load attaching end to form a compact package;
a releasable flexible looped line restraining device connecting the bundled suspension lines immediately adjacent the skirt and temporarily restricting the mouth of the canopy skirt;
whereby upon parachute deployment the bundled suspension lines commence gradually to unravel in an orderly sequential manner commencing from the load attaching device upwardly to the canopy skirt maintaining the suspension lines under constant tension, and ultimately releasing the restraining device to enable the drag surface to inflate 2. The parachute canopy of claim 1 wherein said flexible restraining device comprises a double-slip knot formed in the bundled suspension lines.

3. The parachute canopy of claim 1 wherein said flexible restraining device comprises solely a pair of loops attached to the canopy skirt and adapted releasably to snub the bundled suspension lines.

4. The parachute canopy of claim 3 wherein one of said loops is a female loop adapted to receive a male loop through which the suspension lines are looped to be releasably snubbed.

5. The parachute canopy of claim 4 wherein a portion of said bundled suspension lines are threaded through each loop to form an intermediate loop through which a bight of the remainder of the respective suspension lines are passed to form a slip knot.

6. The parachute canopy of claim 1 wherein said flexible restraining device comprises a plurality of pairs of male and female loops, the male loops attached to one side of the drag surface and the female loops attached to a diametrically opposite point on the drag surface, the male and female loops adapted to be mated when the drag surface is folded together during packaging and an intermediate folded portion of the suspension lines being snubbed by the mated loops.

* * * * *